(12) United States Patent
Page

(10) Patent No.: US 9,684,676 B1
(45) Date of Patent: Jun. 20, 2017

(54) METHOD FOR SEARCHING MEDIA

(75) Inventor: Lawrence E. Page, Palo Alto, CA (US)

(73) Assignee: Google Inc., Mountain View, CA (US)

(*) Notice: Subject to any disclaimer, the term of this patent is extended or adjusted under 35 U.S.C. 154(b) by 878 days.

(21) Appl. No.: 12/206,527

(22) Filed: Sep. 8, 2008

Related U.S. Application Data

(63) Continuation of application No. 10/674,802, filed on Sep. 30, 2003, now Pat. No. 7,437,351, which is a continuation-in-part of application No. 10/113,796, filed on Mar. 29, 2002, now Pat. No. 7,363,291.

(60) Provisional application No. 60/427,490, filed on Nov. 18, 2002.

(51) Int. Cl.
*G06F 7/00* (2006.01)
*G06F 17/30* (2006.01)

(52) U.S. Cl.
CPC .... *G06F 17/3028* (2013.01); *G06F 17/30011* (2013.01)

(58) Field of Classification Search
USPC .......... 707/758, 999.001, 999.003; 705/14.4
See application file for complete search history.

(56) References Cited

U.S. PATENT DOCUMENTS

| | | | |
|---|---|---|---|
| 5,634,051 A | | 5/1997 | Thomson |
| 5,832,212 A | | 11/1998 | Cragun et al. |
| 5,832,494 A | | 11/1998 | Egger et al. |
| 5,933,823 A | | 8/1999 | Cullen et al. |
| 5,963,966 A | | 10/1999 | Mitchell et al. |
| 6,049,799 A | * | 4/2000 | Mangat et al. |

(Continued)

FOREIGN PATENT DOCUMENTS

WO   WO 0201271 A1   1/2002

OTHER PUBLICATIONS

U.S. Appl. No. 10/750,917; Siraj Khaliq et al.; "System and Method for Providing Premium Content On-Line"; filed Jan. 2, 2004; 36 pages.

(Continued)

*Primary Examiner* — William Spieler
(74) *Attorney, Agent, or Firm* — Fish & Richardson P.C.

(57) ABSTRACT

The present invention is directed to a computer-implemented method and apparatus for searching in response to Internet-based search queries using a search engine and an electronic database. According to one example embodiment of the present invention, data sets representing printed items from publications respectively printed by a plurality of respective publishers are input, e.g., scanned-in, and stored in a searchable database. Each data set includes text from at least one printed item. Responsive to the search query, a search engine searches for and identifies relevant web pages and data sets representing printed items from publications and, in a more specific embodiment, ranked characterizations are returned for the relevant web pages and publication items. Another aspect of the present invention is directed to an electronic path for accessing further information about a relevant publication item. In one embodiment, the electronic path is a hyperlink from a characterization of a relevant publication item to a more complete electronic representation of the relevant publication item. Publishers provide authorization to display copyrighted materials through a permission protocol.

26 Claims, 4 Drawing Sheets

(56) References Cited

U.S. PATENT DOCUMENTS

| | | |
|---|---|---|
| 6,285,999 B1 | 9/2001 | Page |
| 6,502,076 B1 | 12/2002 | Smith |
| 6,546,385 B1 | 4/2003 | Mao et al. |
| 6,701,301 B2 | 3/2004 | Seet et al. |
| 6,920,448 B2 | 7/2005 | Kincaid et al. |
| 6,938,051 B1 | 8/2005 | Burger et al. |
| 6,981,040 B1 | 12/2005 | Konig et al. |
| 7,136,875 B2 | 11/2006 | Anderson et al. |
| 7,437,351 B2 | 10/2008 | Page |
| 2002/0010757 A1 | 1/2002 | Granik et al. |
| 2003/0229637 A1 | 12/2003 | Baxter et al. |
| 2004/0049598 A1 | 3/2004 | Tucker et al. |
| 2006/0074913 A1 | 4/2006 | O'Sullivan et al. |
| 2009/0025063 A1 | 1/2009 | Thomas |
| 2010/0174607 A1 | 7/2010 | Henkin et al. |

OTHER PUBLICATIONS

Google, "Google Search Technology" Nov. 16, 2001, Google.
Google, "How to Interpret your Search Results" Nov. 16, 2001, Google.
Page, Lawrence et al., "The anatomy of a Large-Scale Hypertextual Web Search Engine", 1998 Stanford University.
U.S. Appl. No. 10/674,802; Lawrence E. Page; "Method for Searching Media"; filed Sep. 30, 2003; 33 pages.
Baker, Loren, "Google Testing Print Advertising with Publication Ads" Nov. 2005 Search Engine Journal, p. 1-6.
U.S. Appl. No. 13/617,351; Lawrence E. Page; "Method for Searching Media"; filed Sep. 14, 2012; 41 pages.
Co-pending U.S. Appl. No. 14/151,396, by Lawrence E. Page, entitled "Method for Searching Media", filed Jan. 9, 2014, 21 pages.

\* cited by examiner

METHOD FOR SEARCHING MEDIA

RELATED PATENT DOCUMENTS

This application is a continuation of U.S. patent application Ser. No. 10/674,802, filed Sep. 30, 2003 and now issued as U.S. Pat. No. 7,437,351 on Oct. 14, 2008, which is a continuation-in-part of U.S. patent application Ser. No. 10/113,796, filed on Mar. 29, 2002 and now issued as U.S. Pat. No. 7,363,291 on Apr. 22, 2008, the disclosures of which are incorporated herein by reference. U.S. patent application Ser. No. 10/674,802 also claims priority, under 35 U.S.C. 119(e), to U.S. Provisional Application No. 60/427,490, filed Nov. 18, 2002, the disclosure of which is also incorporated herein by reference.

FIELD OF THE INVENTION

The present invention generally relates to computerized research tools and, more particularly, to techniques for searching media using a computer-implemented data network.

BACKGROUND OF THE INVENTION

The World Wide Web (or "Web") contains a vast amount of information in the form of hyperlinked documents (e.g., web pages) loosely-organized and accessed through a data communication network (or "Internet"). Diverse computer networks use a communication protocol to coordinate the exchange of information. For example, access to the Internet sometimes uses the Transmission Control Protocol/Internet Protocol (TCP/IP) with a client-server model of computer hierarchy. The server provides information commonly presented in the form of viewable web pages, and the client being a computer retrieving the information (i.e., selecting for display desired web pages). A hierarchical collection of related web pages is commonly referred to as a web site. Web pages may contain electronic documents, images, sounds, video, etc.

One of the reasons for the virtually explosive growth in the number of hyperlinked documents on the Web is that just about anyone can upload hyperlinked documents and other information, organized in any number of different structures. A vast majority of the information includes hyperlink "shortcuts" to other information located in other hyperlinked documents. The unstructured nature and sheer volume of data available via the Internet makes it difficult to navigate efficiently through related information while avoiding unrelated information. A user often uses a computerized search engine to sort through the large quantity of information accessible via the data network.

A search engine attempts to return relevant information in response to a request from the user. This request usually comes in the form of a query (e.g., a set of words that are related to a desired topic). A common way of searching the Web is to find web pages containing all or many of the words included in the query; such a method is typically referred to as text-based searching. Search engines typically respond to such a query by returning a display of links associated with web pages and a brief description of the content provided by the web pages. Because the number of pages on the Web is typically very large, ensuring that the returned pages are the most relevant to the topic sought by the user is a central problem in Web searching.

While the Web platform is an invaluable research tool, one should not overlook the usefulness of more conventionally-available media such as printed media, CDs, DVDs, audio books, and the like. Significant time-sensitive information is still published and disseminated in these more conventional forms. Printed material, for example, includes special editions on recent important events and periodicals such as magazines, newspapers, and journals. Information that was generated before widespread use of the Web is often available only in printed media form and, although indexes of hard-copy-printed materials are increasingly available for searching by computer methods, the printed material is frequently not directly available for viewing through the Web. Conventionally, searching printed media via the Web involves directing a search engine to find web sites having printed document indices, and subsequently searching the index within the web site for relevant printed materials using another dedicated, intra-web-site search engine.

Frequently, the printed media itself is not viewable through the data network, particularly if the search result is a book or magazine published and sold in hard copy for profit. Therefore, search results for an intra-web-site search engine typically do not include further hyperlinks to the actual printed media, but rather a citation to the hard copy document. To determine relevance for printed media cited by a web-based search, a researcher is often required to physically retrieve and review a printed hard copy from a depository, such as a library.

As the pool of researchable media continues to increase, so does the need for more efficient searching and viewing tools.

SUMMARY OF THE INVENTION

The present invention is directed to a computer-implemented method for searching conventionally-available media in response to Internet-based search queries using a search engine and a searchable electronic database. The present invention is exemplified in a number of implementations and applications, some of which are summarized below.

According to another embodiment, the present invention is directed to a machine-implemented method that searches both web-accessible documents (e.g., Internet web pages in a web-based implementation of the invention) and publication items respectively produced by a plurality of respective publishers, the publication items being stored as data sets representing the publication items. The publication items searched are stored in a searchable electronic database. In response to a search query, the machine electronically searches the web-accessible documents that are relevant to the search query and searches the data sets in the electronic database for data sets that are relevant to the search query, thereby identifying web-accessible documents and relevant data sets corresponding to relevant publication items. Returned as search results are: at least one characterization of at least one of the relevant web-accessible documents; and at least one characterization of at least one of the relevant publication items and, for said at least one of the relevant publication items, an electronic path for accessing further information.

Consistent with the above machine-implemented method, more specific embodiments are directed to publication items such as audible (e.g. music) and various types of video documents, and to producing with the search results linking data that would permit subscription-like access to further information about the relevant publication items. In one such specific embodiment, the electronic path for accessing further information corresponds to the linking data for permitting the subscription-like access.

According to another embodiment, the present invention is directed to a computer-implemented method that searches both (e.g., non-publication) documents and printed items from publications, the printed items being stored as data sets representing the printed items from publications. The printed items searched by the present method are stored in a searchable database, and include material printed by a plurality of respective publishers. Each data set includes text from at least one of the printed items. Responsive to a search query, the search engine searches for and identifies relevant non-publication documents and relevant data sets representing printed items from publications. The search engine returns at least one characterization each for at least one of the relevant non-publication documents, and for at least one of the relevant publication items and ranks the characterizations. An electronic path for accessing further information is provided for relevant publication items. The electronic path is a hyperlink that when accessed links a relevant publication item to a more complete electronic representation of the relevant publication item.

In another example embodiment of the present invention, a computer-implemented arrangement is provided, including a search engine and a searchable electronic database. The computer-implemented arrangement is adapted to respond to Internet-based search queries, and further includes a memory bank and a first programmable computer node. The memory bank and the programmable computer node are adapted to store the searchable database as data sets representing printed items from publications respectively printed by a plurality of respective publishers. Each data set includes text from at least one of the printed items. A second programmable computer node includes the search engine, and is adapted to respond to a search query by searching for, identifying and returning at least one characterization of at least one relevant web pages and a data set from the electronic database corresponding to a characterization of at least one of the relevant publication items. An electronic path for accessing further information is provided for relevant publication items returned.

In another example embodiment of the present invention, a method is provided for maintaining an electronic database that is searchable via a search engine in response to Internet-based search queries. The method includes storing in the searchable database data sets representing printed items from publications respectively printed by a plurality of respective publishers. Each data set includes text from at least one of the printed items. Information as to whether the respective publisher has authorized display of the printed item is recorded with each stored data set representing a printed item. The method further includes searching for relevant web pages and relevant data sets in the electronic database responsive to the search query, thereby identifying relevant Internet web pages and relevant data sets corresponding to relevant publication items. At least one characterization of at least one of the relevant web pages and at least one characterization of at least one of the relevant publication items may be returned responsive to a search. An electronic path is provided for each relevant publication item for which the respective publisher has authorized display, the electronic path accessing a copyrighted version of the relevant publication item when acted upon.

In another example embodiment of the present invention, an arrangement is provided for maintaining an electronic database that is searchable via a search engine in response to Internet-based search queries. The arrangement is adapted for storing in the searchable database data sets representing printed items from publications respectively printed by a plurality of respective publishers. Each data set includes text from at least one of the printed items. The arrangement is also adapted to record whether the respective publisher has authorized display of the printed item. Authorization information is recorded with each stored data set representing a printed publication item. Furthermore, the arrangement is adapted to search for and identify relevant Internet web pages and relevant data sets in the electronic database responsive to the search query. The arrangement is adapted to return at least one characterization of at least one of the relevant web pages and at least one characterization of at least one of the relevant publication items. For relevant publication items for which the respective publisher has authorized display, the arrangement is adapted to provide an electronic path for accessing a copyrighted version thereof.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
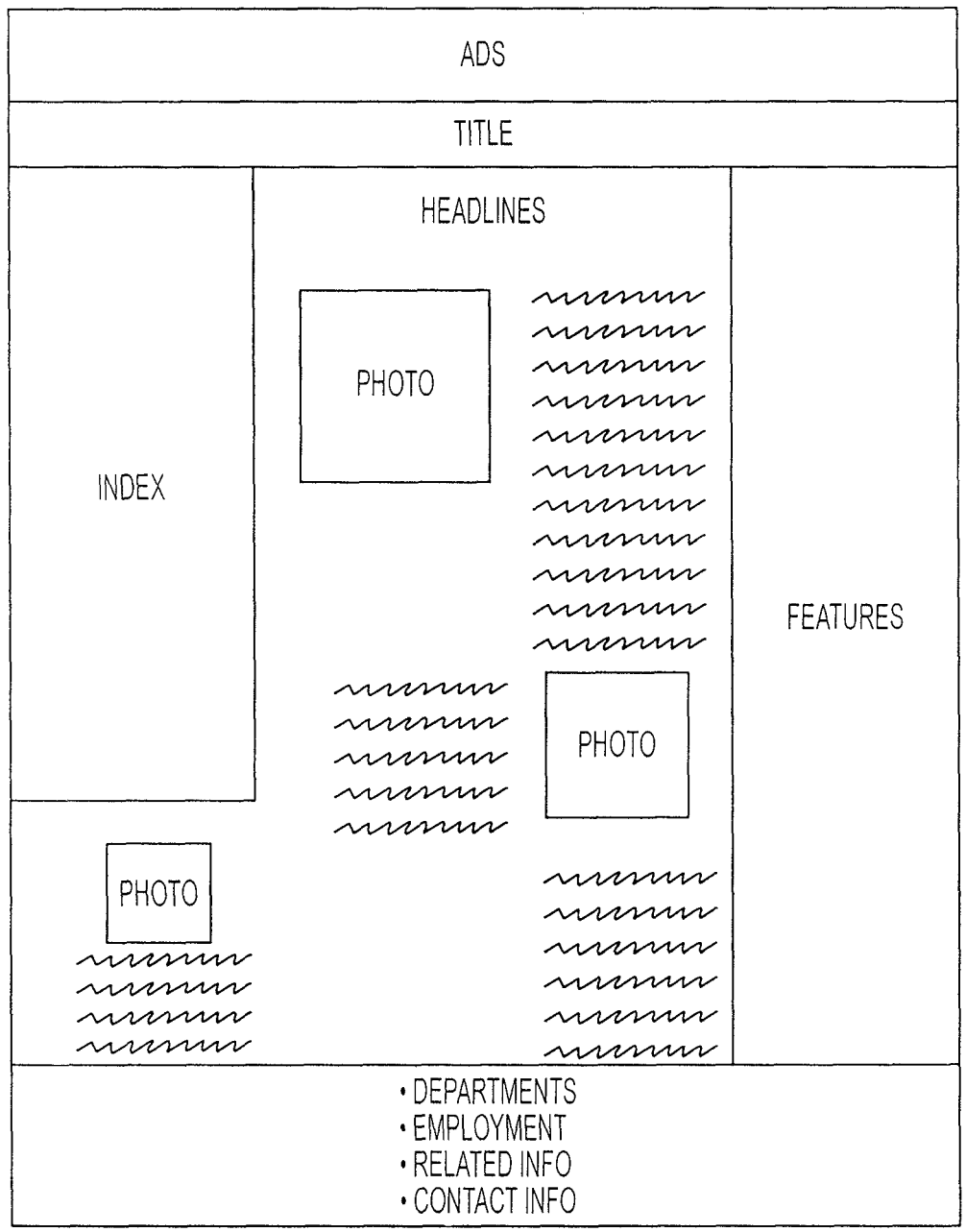
FIG. 1 illustrates a typical web site home page associated with a magazine; each of FIGS. 2A and 2B illustrates a hyperlinked electronic image with portions thereof arranged as a replica of a source printed media, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described.

DETAILED DESCRIPTION

The present invention is applicable for computerized-based search techniques. The present invention has been found particularly suited, but should not be limited, to integrated Internet-based search techniques encompassing web pages (hyperlinked documents) and information in a media form that is not typically readily available over the Internet; such media includes, for example, printed publications. While the present invention is not necessarily limited to using an Internet-based search engine to search an electronic database of certain media types of publications responsive to a user query, embodiments of the invention may be appreciated through a discussion of various examples using such specific contexts.

One general example embodiment of the present invention is directed to a computer-implemented method for using a search engine to search web pages as well as an electronic database in response to an Internet-based search query. A plurality of computers and web page servers communicatively coupled through a communication system comprise a data network, for example, the Internet. The searchable database includes electronic versions of printed media stored in a memory bank and coupled to a computer node of the data network. In another configuration, the searchable database is stored in multiple memory banks that are located at various nodes along the data network and coordinated logically to operate as a unified memory arrangement.

A more specific embodiment of the present invention involves such a computer-based machine that is implemented to search and find relevant items using both a web-type search effort for locating documents that one would expect to find via an Internet-based search, and also other types of published items that one would not expect to find via an Internet-based search. These other types of published items include, for example, printed publications, and published music and videos. In some instances, although not always, these other types of published items are not accessible on the Internet because their respective publishers provide access thereto only through subscriptions. In either situation, these other types of published items are stored as respective data sets and are stored in a searchable electronic database. A user, or other input source, prompts the computer-based machine with a search query. In response, the machine then electronically searches both the web-accessible documents and these respective data sets for relevant items. Returned as search results are characterizations of any relevant web-accessible documents and of any respective data sets (for the relevant publication items) and, for the respective data sets, an electronic path for accessing further information. In more specific embodiments, the electronic path permits access to more characterizations of the relevant items, to information for permitting the subscription-like access, and to information about the author and/or publisher of the items.

The memory bank arrangement is adapted to store and maintain the searchable database as data sets representing printed items, the printed items being from publications printed by a plurality of respective publishers. The database can include application software necessary to organize and relate the stored information, making the information retrievable. Each data set can include text, graphics, or both from one of the printed items. In one implementation the database is a relational database and in another implementation, the database is a library of hyperlinked documents hosted on at least one web page server coupled to the data network.

Web pages, or hyperlinked documents, are hosted by at least one web page server. A user accesses and navigates the data network through a computer terminal coupled to the data network and an application program, typically referred to as a browser. Another programmable computer node includes a search engine application, the search engine being accessible by the user through the user's browser application and the data network. The user enters a search query, for example a keyword search, and the search engine is adapted to search portions of the data network responsive to the user's search request to identify data network (logical) destinations relevant to the user's search query. The search engine then returns for display results of the search including at least one characterization of a relevant web page destination, and at least one characterization of a destination data set representing a relevant printed item. Each characterization includes an accompanying electronic path recognizable by the user's browser to navigate to a data network destination related to the respective search result for retrieval of additional information. A search engine searching web pages includes the search engine searching indices of web pages and other conventional search engine "shortcuts" used to search the content of hyperlinked documents on a data network.

In one example arrangement of the present invention, printed media is electronically scanned-in on an item-input arrangement, such as a scanner or digitizer, to create a data set representing the printed media. For example, each page of a publication is scanned-in to generate an electronic version of the page as a data set. The scanner includes a digitizing device and appropriate control software adapted to organize resulting digital data into a compatible data set format. In one example arrangement, the scanner is communicatively coupled to the data network. Another example involves the scanner being communicatively coupled to the database. In yet another example, data sets generated by the scanner are stored and transferred via a storage media, such as disk or tape, to the memory arrangement containing the database of printed items.

Another example arrangement of the present invention includes a download path from a publisher, for example via the Internet or direct communication link, to the database and arranged to download another electronic version of printed items. The download path is adapted to generate electronic versions of the published items for storage in the database. The database of published media items optionally includes data sets obtained through various sources, for example data sets of published publications received electronically directly from a publisher, as well as data sets created by scanning-in printed versions of publications.

In one embodiment, data sets may be arranged to correspond to a single page, or portion of a page of a printed item. Other data set configurations may be contemplated as well, including scanning-in two facing pages of a publication as one data set such that a data set represents a reader's "view" when the publication is opened-up for normal viewing. A data set can include an entire publication in another data set arrangement. In another data set arrangement, a data set includes a single picture, article, advertisement and the like. For example, an article in a printed item frequently extends over several pages wherein the data set can contain the entire article. Data sets optionally may include relational information linking a data set to one or more other data sets. For example, if each page of a publication comprises a data set, each data set of an issue of the publication can include information relating the data set to other data sets (representing other pages) of the particular issue.

Responsive to an Internet-based search query, the search engine searches for and identifies relevant Internet web pages, and searches the data sets of the electronic database for relevant data sets corresponding to relevant printed items from publications. Characterizations, that may indicate the source or subject, are returned for one or both of relevant web pages and relevant publication items. A characterization can be one of a variety of forms including a brief summary of the printed item, an excerpt or snippet of the printed item, a headline, editorial, graphic, keyword, or other description of the source. Characterizations are classified in one arrangement, being arranged by category, web sites, web pages, news, shopping or other grouping. Characterizations are optionally classified into one group resulting from a search of the electronic database of printed items, and another group resulting from a search of Internet web pages, indices, web sites and other user-accessible hyperlinked documents.

According to another aspect of the present invention, a search engine searches for and identifies relevant Internet web pages, and optionally searches the data sets of the electronic database for relevant data sets corresponding to relevant-printed items from publications. In one embodiment, the option to search data sets of the electronic database of printed items from publications in addition to web pages/sites is user controlled. The search engine search can be confined to the electronic database of printed media at a user's option.

An electronic path for accessing further information is provided as part of, or accompanying, a characterization for relevant publication items. In one embodiment, the electronic path is a hyperlink that when acted upon links a characterization of relevant information to a more complete electronic representation of the relevant information. For example, a search engine, determining that several web pages and one data set representing a printed item each contain relevant information, returns characterizations of the web pages and of the data set. A hyperlink is provided with each characterization, the hyperlink destination being a more complete electronic representation of a relevant web page or printed item respectively. In one embodiment of the invention, a characterization includes hyperlinks to multiple data sets representing a plurality of printed items. For example where an article of a particular subject matter extends over a plurality of pages in an issue of a source printed publication, each page being represented in a separate data set, a characterization returned by a search engine might summarize the entire article and include a hyperlink to each of the data sets whereby each data set represents a page of the article.

In one embodiment, a hyperlink accompanying the search engine's characterization of a web page can direct a user to the particular web page, while a hyperlink accompanying the search engine's characterization of a web site can direct a user to a relevant web page of the particular web site. Similarly, in another embodiment of the invention, a hyperlink accompanying the search engine's characterization of a data set representing a printed item from a publisher can direct a user to a more complete electronic representation of the printed item. For example, a hyperlink accompanying the search engine's characterization of a data set representing a printed item from a publisher directs a user to a complete text of the printed item. The complete text may include accompanying photographs, illustrations, advertisements and/or other graphics or media. In an alternative implementation, a hyperlink from a characterization of a data set representing a printed item directs a user to a continuation of information returned by the search engine as the characterization. For example, where a characterization of a printed item includes the first sentences of the printed item, a hyperlink directs the user to a data set containing the entire printed item text including a continuation of the text following the first sentences used as the characterization. In one embodiment of the invention, the hyperlink may direct a user to a publisher's web page.

In a more specific embodiment of the present invention, the search engine ranks the characterizations returned by some criteria. For example, search result characterizations are ranked according to projected relevance of each source with respect to the search query. In one example embodiment, characterizations of web pages are listed and ranked independently from characterizations of data sets representing printed items from publications. In an alternative arrangement, web pages and printed items are listed together and ranked integrally such that more relevant printed publications are ranked higher than less relevant web pages, and more relevant web pages are ranked higher than less relevant printed items; such relevance ranking can be achieved, for example, as described in the above-referenced patent documents, fully incorporated herein by reference.

In one embodiment of the invention, a portion of the printed items that are represented by the stored data sets in the searchable database are copyrighted items. Data sets are, for example, created by electronically scanning-in a copyrighted printed item and generating scanned printed items. A publisher of an item may provide authorization permitting display of the copyrighted printed item through a permission protocol. Permission to permit retrieval and/or display of copyrighted material may be recorded, for example in respective data sets along with information representing the copyrighted item. In one embodiment of the invention, executing the permission protocol permits the search engine or browser to display more text from the copyrighted material in one characterization of the copyrighted printed item. In another embodiment, the permission protocol permits display of copyrighted material after a hyperlink portion of a characterization of the copyrighted material is acted upon by a user, the characterization being returned by a search engine in response to a user query. In yet another embodiment, a permission protocol is executed in which a publisher provides authorization over the Internet permitting a search engine or browser to display copyrighted material responsive to an authorized user, e.g., a representative of the publisher, submitting a search query, and the search engine provides an electronic path for accessing further information about the copyrighted material.

In another example embodiment, a permission protocol authorizing display of copyrighted material is made conditional. For example, access to copyrighted works is conditioned on payment of a fee, or conditioned that the copyrighted material be accompanied by certain advertisements, or conditioned on satisfaction of some other term or condition. In another example arrangement of the present invention, portions of copyrighted items that are not authorized for distribution and display via the data network are blocked. Through a permission protocol, a publisher selects portions of a data set representing a printed publication where distribution/display is permitted, and selects portions of the data set where distribution/display is not permitted. For the restricted portions, the publisher may permit distribution/display when a condition is met, e.g., using a permission protocol.

The permission protocol can be computer-implemented, and may also be executed by the publisher over the Internet or by some other electronic means. The permission protocol may be executed by the publisher, or other authorized entity, from a programmable computer communicatively coupled as a node on the data network. One example permission protocol includes a publisher being provided access to data set configuration information separate from user access to data set information. The publisher selects or otherwise designates those portions of copyrighted materials that are authorized for retrieval and display, and those portions which are not authorized for retrieval and display. Authorized portions of copyrighted items in the database are displayable, and portions not authorized are blocked from retrieval and display to users. In one implementation, authorization is achieved by selecting a portion of the copyrighted material from a display of the copyrighted material available only to the publisher; for example, the publisher may select portions similar to the way a hyperlink is selected from a web page display. In another implementation, the publisher provides authorization over the Internet for the search engine to display more text from a copyrighted printed publication, the authorization being given in response to the search engine providing an electronic path (e.g., hyperlink) for accessing further information about the copyrighted printed publication.

According to another important aspect of the present invention, advertisements printed with a respective printed item can be stored in a data set with the published (or printed) item. For example, a magazine page having an article of text and an advertisement, are stored together and displayed together as one data set. An advertisement portion of a data set is included in a characterization returned for the data set responsive to a search in one example arrangement. A permission protocol simultaneously controls display of the text and advertisement. Alternatively, display of the advertisement and the text article are controlled separately via the permission protocol. In another example, a text article and an advertisement are stored in separate data sets, but linked to enable display together, independently, or in combination with other data sets.

According to a further aspect of the present invention, storing data sets representing advertisements includes storing information for linking the advertisement to information about a product (or service) represented in the advertisement. For example, an advertisement portion of a data set is hyperlinked to a hyperlinked document containing additional information about the advertised product or service. An advertisement portion of a data set is alternatively hyperlinked to the product manufacturer's, vendor's/distributor's, or other related entity's web site. Storing data sets representing advertisements can also include storing information for displaying information about a product represented in one of the advertisements.

New advertisements, advertisements not included in the source printed publication, are embedded in characterizations or displays of relevant publication items and are returned with the electronic representation of the publication when the electronic representation is retrieved from the database. In another arrangement, returning (e.g., for display) information from a data set representing an advertisement includes directing the search engine or browser application to update advertisement information. For example, updated advertising information from the advertiser's web site is incorporated into display of an advertisement and, optionally, into the data set for subsequent retrieval by other users.

In one embodiment of a computer-implemented method of the present invention, an index is created of the data sets in the searchable database and a search engine is used to search web pages and the index of the electronic database in response to an Internet-based search query. The index is created through a programmable computer communicatively coupled to the data network, and having access to the data sets of the database. In one implementation, the index is created through a software application adapted to determine key words from text-based data sets. Alternatively, a human editor creates the index and enters index information through a computer interface after reviewing the printed item or an electronic representation thereof. Index information is stored in a memory arrangement coupled to the data network. The electronic database includes data sets representing printed items from publications respectively printed by a plurality of respective publishers. For example, the database includes magazines, newspapers and other periodicals from a plurality of publishers. Each data set includes text from at least one of the printed items. The search engine returns characterizations of index entries for data sets of source printed items, including an electronic path, such as a hyperlink, from the index entry characterization to another representation of the source printed item.

According to another embodiment of the present invention, a data set representing a printed item is configured to display as a replica of the corresponding printed item. For example, a scanner is used to digitize a printed item and arrange the digital data in a format (e.g., portable document format, or pdf) permitting retrieval and display of an electronic representation of the printed item on a computer display as a replica of the source printed document.

Another embodiment includes converting each page of a printed document, such as a magazine, into an HTML-based hyperlinked document for storage in an electronic database as previously described. A conversion is accomplished by optical character recognition (OCR) scanning a printed item using a scanner. Each page of scanned image is stored in a library, or database, of scanned images. Portions of the resulting hyperlinked document are delineated and appropriately hyperlinked to other portions of the document and/or other hyperlinked documents using a programmable computer. Pages of a magazine issue are linked together, for example, each page being linked to a preceding and subsequent page. Portions of articles continued between pages are linked together to aid navigation through the entire article. Advertisements are detected and made linkable. In one embodiment, advertisements are linked to an order-processing web page where the advertised product can be ordered. In another embodiment, advertisements are linked to an advertiser's web page, or to the advertised product's home page enabling a user to navigate quickly and easily to find additional information about the advertised product.

Printed items converted and stored as hyperlinked documents are optionally linked to a publisher's web site or other related web site, such as an associated organization Internet web site. The associated web site may be specific to a particular publication title, publishing/distributing organization, subject matter, index or some other relationship. For example, a magazine publisher may maintain a web site dedicated to a magazine title, and have the web site updated periodically with timely information. The web site may be a marketing tool to entice the purchase of a hard copy version of the printed media. A book publisher may include information from many book titles within a single web site.

A web site associated with a printed document such as a magazine typically includes text articles and photos common to the printed publication, but there are often differences between the content of the web site and the printed media. For example, the collection of hyperlinked documents constituting the web site can be uniquely configured to incorporate additional features that are not available through printing, including additional photos, video clips and other media.

FIG. 1 illustrates a typical web site home page for a magazine. The typical periodical home page includes advertisements, a title banner, an index (similar to a table of contents) to navigate the web site, headlines with text article summaries and accompanying photos, a features index, contact and other general information. Although the dressing is unique from periodical to periodical, the classifications of information presented on each home page are typically arranged like a combination of the original printed document's cover, table of contents, and other portions of the magazine all rolled into a single page. Further, the conventional home (web) page can contain hyperlinks to other web pages. For a particular hyperlink, the associated web page might contain only a subset corresponding to text and photos, rather than a view of the actual printed magazine article; moreover, this subset of information is often available for only a limited time after it has been initially published.

Figure 2A:
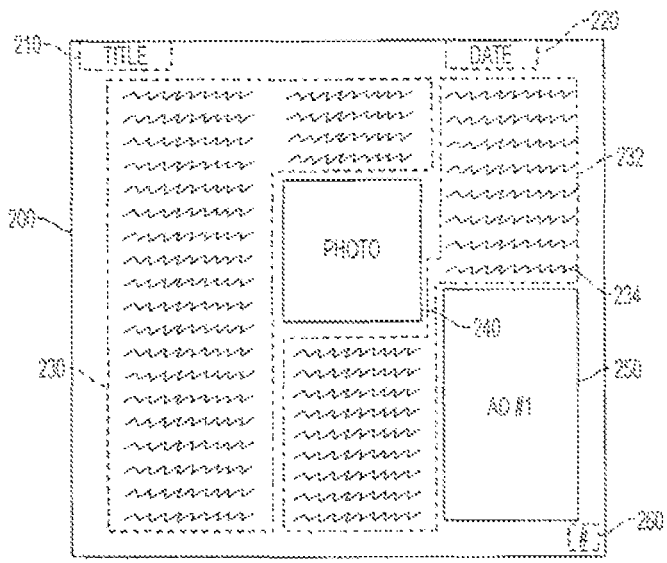

FIG. 2A illustrates an arrangement of an electronic image 200 generated from a printed media, according to an embodiment of the present invention. From a subscription of a printed media edition, the printed media is scanned-in using OCR into an HTML formatted (hyperlinked) electronic image. The electronic image is stored as a digital data set, arranged and configured to display as a replica of the source printed media. Hyperlinks are edited to create, add or subtract appropriate hyperlinks to other hyperlinked documents. A snippet or abstract of the source printed media is also stored as a data set, the abstract being hyperlinked to the electronic image of the source printed media. A snippet can be extracted from the source printed media electronic image, for example, the first paragraph of a text article, or developed manually by a human editor. Other information is optionally added to the data set designed to aid subsequent searching of information conveyed by the electronic image. Indexing and/or cross-referencing information is added to increase searching speed, efficiency or other criteria. Each electronic image data set may optionally include classification information such as date, subject matter, publisher, or other distinguishing features.

In one embodiment, both the electronic image of the source printed media, and snippet/abstract (if any) are configured as searchable data sets. For example, the electronic image of the source printed media and/or snippet/abstract are stored in a common portable document format (pdf) file. In an alternative example embodiment, the snippet/abstract may be searchable and hyperlinked to the electronic image of the source printed media, though the electronic image of the source printed media may only be viewable, but not searchable.

In a typical application, the electronic image has a title portion 210, a date portion 220, article text portions 230 and 232, a photo portion 240, an advertisement portion 250, a page number portion 260, or any combination thereof. The portions of the electronic image correspond to portions of the source printed media. A particular electronic image may include any or all of the above-mentioned portions, arranged in many different configurations. The quantity of various portions are not limited, for example, an image might contain three photos and no advertisements, or two advertisements and no photo, only an article text portion and no ads or photos, or any other layout arrangement.

Printed media may be a single page document (e.g., a letter, leaflet, photograph or flyer), or be comprised of a plurality of pages (e.g., a magazine, book, microfilm where the frames are considered pages). In one embodiment of the present invention, for printed media having a plurality of related pages, an electronic image is arranged as a replica of one of the pages. In an alternative embodiment of the present invention, an electronic image is arranged as a replica of two facing pages, as might be viewed together by opening a bound book or magazine. In another embodiment, an electronic image may be arranged as a replica or representation of a portion of one or more pages. Related portions of the electronic image may be hyperlinked together. For example, a first part of a text article appearing on one electronic image may be hyperlinked to a second part of the text article appearing on another electronic image when the text article extends from one page to another of the printed media. Other relationships between electronic image portions may exist as well. An accompanying photo or advertisement may be hyperlinked to display with a particular text article. Or each portion of an advertisement that extends over a plurality of pages in the printed media may be hyperlinked together, or alternatively linked to display concurrently.

In an alternative embodiment of the present invention, the portions of the source printed media are not stored as a single electronic image of the source printed media, but stored as individual portions. A text article extending over several pages in the source printed media may be stored electronically as a single portion. Similarly, an advertisement extending over several pages of the source printed media may be stored as a single portion. Portions may be appropriately hyperlinked according to source printed media associations, for example a photo or advertisement linked to a text article. Alternatively, the photo or advertisement may be linked to display concurrently with an accompanying text article.

Figure 2B:
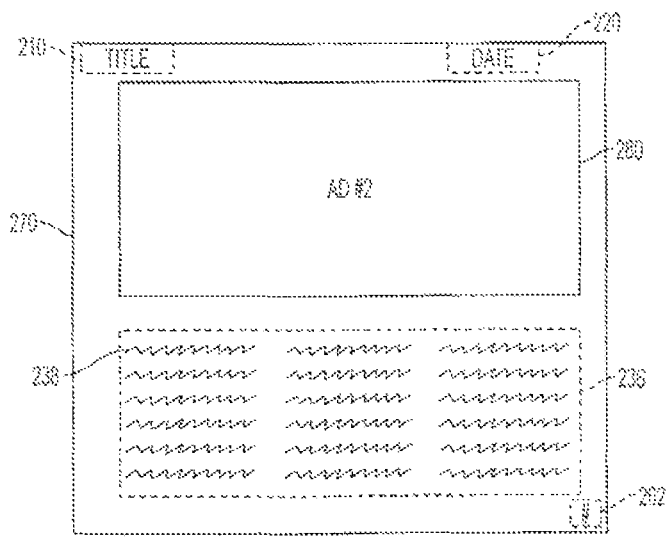

FIG. 2B illustrates a further arrangement of an electronic image 270 generated from another printed media source, and includes an advertisement portion 280 and text portion 236, in addition to title, date and page number portions similar to FIG. 2A. Page number portion 262 in FIG. 2B is similar to page number portion 260 in FIG. 2A, but will indicate a different page number. Electronic image 270 again is arranged as a replica of the printed media source from which electronic image 270 was created to represent.

The electronic images of FIGS. 2A and 2B are hyperlinked documents in one embodiment of the present invention. A data set defining an electronic image includes hyperlinks from portions of the electronic image to other hyperlinked documents. For example text 232 may be logically hyperlinked to another hyperlinked document, electronic image 270 for example. Other examples of hyperlinking include linking title portion 210 to a web page replica of the printed media cover, or alternatively to a publisher's or distributor's home web page. Advertisement portions 250 can be linked to an ordering web page, a web page offering additional information concerning the advertised product/service, linked to the advertiser's home web page or any other advertiser-designated web page. In a further embodiment, sub-portion hyperlinks are included in the electronic image. For example, an end word 234 of text portion 232 may be linked to a beginning word 238 of text portion 236 if text portion 236 is a continuation of text portion 232. Other words or phrases within text portions can be linked to web pages having information related to the linked word, as is a well-known hyperlinking practice. Photo portions may be linked to further video clips or web pages having additional related photos or information, even photographer information. Page number portions may be linked to a previous or following page if the electronic image is one of a sequence of electronic images derived from a multi-paged source printed media.

Copyright protection may limit handling of some published works; therefore, permission of a holder of the copyright (e.g., an authorized representative of the copyright owner) for a particular published media may be necessary before a replica electronic image may be displayed via a data network or otherwise used in certain restricted ways. In certain of these embodiments of the present invention, permission is obtained from the copyright holder to use (i.e., display, search, etc.) the published media.

Figure 3:
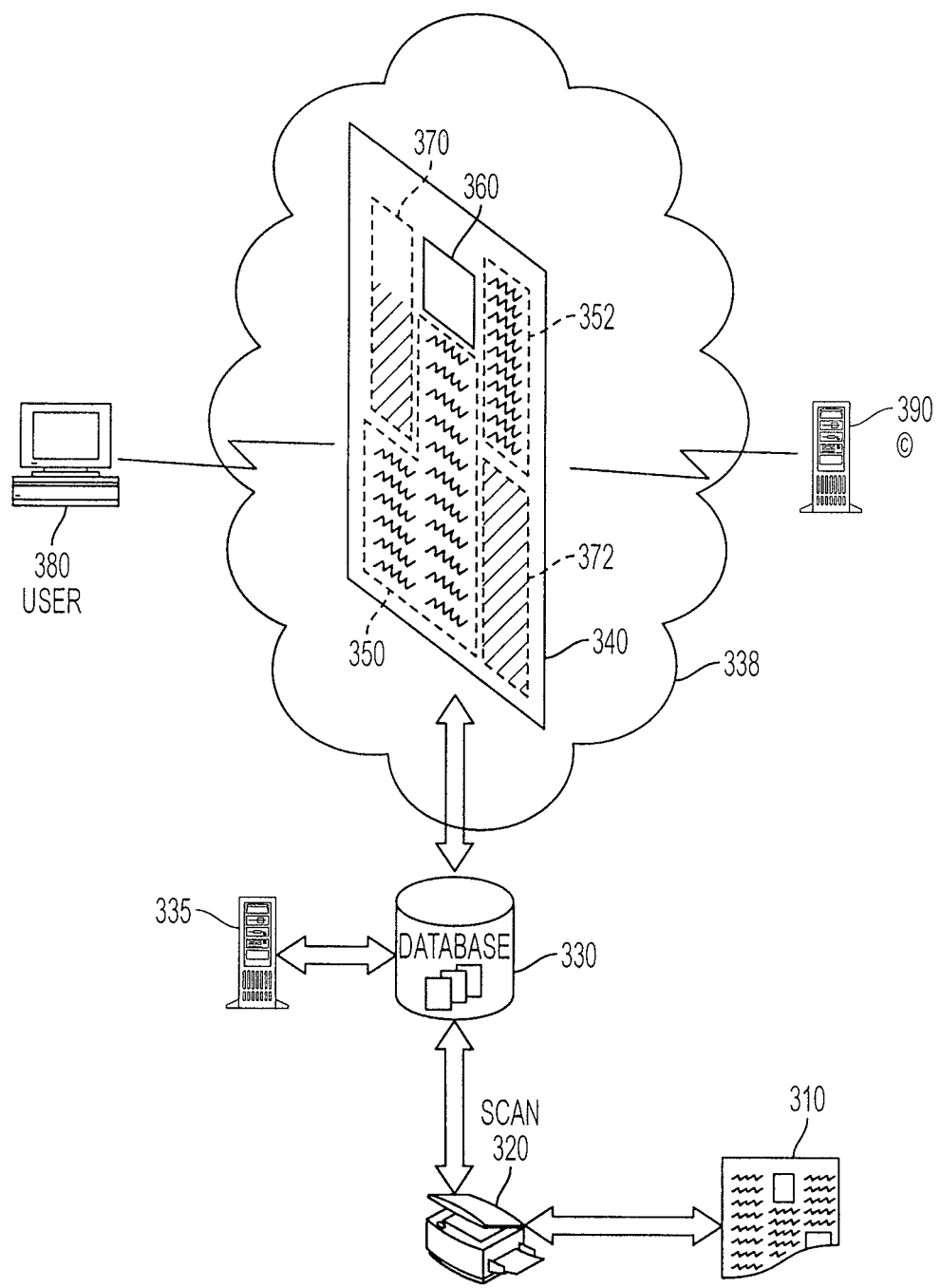
FIG. 3 illustrates an arrangement and method for processing an electronic image having copyright holder-selected display portions, according to various example embodiments of the present invention.

Also consistent with the present invention, permission is obtained through a computer-implemented permission protocol. FIG. 3 illustrates an example method of such a protocol, in accordance with one embodiment of the present invention. In this example method, printed media 310 is converted into an electronic image 340 by scanner 320, electronic image 340 being a data set defining a display of a replica image of printed media 310. Electronic image 340 is thereafter stored in database 330, database 330 being hosted by server 335 which is coupled to a data network 338, for example, the Internet. Physical connection to the data network is through server 335, by conventional means (not shown). User's computer terminal 380 and copyright holder's computer 390 are also communicatively coupled to the Internet 338 by conventional means (not shown). In one embodiment of the present invention, electronic image 340 is configured as a hyperlinked document (e.g., a web page). Electronic image 340 is conditionally available to user 380 by one access path, and available to copyright holder 390 by an independent access path. For example, one version of the electronic image is available to users at a particular hyperlinked document address. Another version of the electronic image is available to copyright holders at another hyperlinked document address. Each of the hyperlinked document access paths may be controlled by a password, or other security measures as is conventionally known. The condition of availability to the user and the copyright holder is supervised by server 335. FIG. 3 symbolically shows that user 380 and copyright holder 390 view electronic image 340 from different perspectives, a user seeing only those portions allowed by a copyright holder.

The data set defining electronic image 340 may also include additional information not included through the source printed media 310, hyperlinks for example which are added to electronic image 340. Various portions of an electronic image are defined corresponding to portions of source printed media, the portions being defined from the layout of source printed media. Portions may be hyperlinked to related hyperlinked documents, allowing a user to select hyperlinks by known methods. FIG. 3 shows electronic image 340 including text portions 350 and 352, a photo portion 360, a text portion 370 and an advertisement portion 372. The portions of electronic image 340 are arranged corresponding to the arrangement of text, photos and advertisement information of source printed media 310 in one example embodiment of the present invention.

According to another particular embodiment, by default, electronic image 340 is not viewable by user 380 through the data network until after copyright holder 390 provides permission via a permission protocol. Copyright holder 390 has intellectual property (e.g., copyright) rights to printed media 310 and is provided controlled access to electronic image 340. Copyright holder's access to electronic image 340 via the Internet may be controlled by password or other web-based security measures as are known by those skilled in the relevant art. Through the copyright holder's access, the copyright holder is able to view all portions of electronic image 340. According to one aspect of the present invention, the copyright holder optionally electronically designates that electronic image 340 may be made available (e.g., viewable) to users through the data network. The copyright holder's designation is included in the data set defining electronic image 340.

The copyright holder can electronically designate that one or more portions of electronic image 340 be made available (i.e., viewable) to users through the data network. Designation of portions of electronic images is accomplished through a permission protocol. For example, in one embodiment, the permission protocol permits viewing of electronic images by agreement with the copyright holder, unless and until the holder designates that a particular portion not be made viewable. Alternatively, the permission protocol may include a default that electronic images not be viewable until designated by the copyright holder.

The copyright holder may be given controlled access to one version of an electronic image, the electronic image being a web page, for example. The entire electronic image may be viewable by the copyright holder. The electronic image is displayed to the copyright holder in a way that indicates whether portions of the electronic image are in display mode or non-display mode. For example, display and non-display modes are differentiated by color shading, by display layering similar to computer aided design drawings, or by other conventional means capable of visually communicating a portion's display status. A copyright holder selects a display mode for a portion by selecting, then toggling the mode in one embodiment. In another embodiment, the copyright holder selects a portion to control, then chooses a display mode to apply to that portion from a menu similarly to controlling the formatting of an area of a document through a word-processing application. Portions of the electronic image in display mode are viewable by a user accessing another (user's) version of the electronic image. Portions of the electronic image in non-display mode are not viewable by a user retrieving a user's version of the electronic image. Data indicating the viewing mode for each portion may be stored in the data set for the electronic image.

Also consistent with the present invention, permission protocols can include time-triggered permission. For example, by prior standing agreement with the copyright holder, portions of an electronic image may be viewable all the time, or may be viewable after some elapsed time measured from a date certain, a publishing date of the printed media for example.

In another embodiment of the present invention, an electronic image is received in electronic form directly from the copyright holder, and optionally includes display designations in the data set defining the electronic image prior to being stored in a searchable database.

In one embodiment, the permission protocol is implemented in real-time. When a user retrieves electronic image 340 after selected portions of electronic image 340 have been designated viewable and other portions have not, electronic image 340 displays a replica of printed media 310, but with the designated non-viewable portions being blank.

According to other embodiments, non-viewable portions include an explanatory designation, or are hyperlinked to a viewable portion contingent on payment of a fee by the user or fulfillment of some other criteria for facilitating greater access to the non-viewable portions.

FIG. 3 illustrates two non-viewable portions, shaded portions 370 and 372. Portion 370 is a text portion. The text portion 370 is viewable by copyright holder 390, but not by user 380. Portion 372 is an advertisement portion, again viewable by copyright holder 390, but not by user 380. Other portions of electronic image 340 are arranged in locations corresponding to printed media 310. If copyright holder 390 ever designates, via a permission protocol, portions 370 and/or 372 to be viewable, then subsequent displays of electronic image 340 to user will include text portion 370 and/or advertisement portion 372 as they appear in printed media 310. For example, in order to aid sales of printed media 310, a copyright holder may time delay appearance on the web of some or all articles of printed media 310. In another example, a magazine publisher might charge one rate to have an advertisement appear in printed media 310, and an additional fee to have the advertisement also appear to web-based viewers, such as user 380. If the advertiser opts not to advertise on electronic image 340, display of advertisement portion 372 is simply blocked through the permission protocol and user 380 does not see advertisement portion 372.

According to another embodiment, through the permission protocol, a copyright holder modifies the data set of electronic image 340 to display an alternative advertisement within selected advertisement portions, rather than leaving advertisement portions non-viewable. According to a further aspect of the present invention, substituted portions are indicated to users as being different than the source printed media.

According to yet another embodiment, the permission protocol is integrated with a commercialization mechanism whereby either the copyright holder is paid to permit electronic images of printed media to be displayed to a user selecting a hyperlink from an abstract, or the database owner is paid by the copyright holder to include displayable electronic images of printed media in searches. Advertisers may compensate the database owner, the copyright holder, or both. In an alternative embodiment, the database owner may be compensated to include related links from electronic images to particular destination hyperlinked documents, or compensated for permitting the database to be included in a web-based search engine search.

Figure 4:
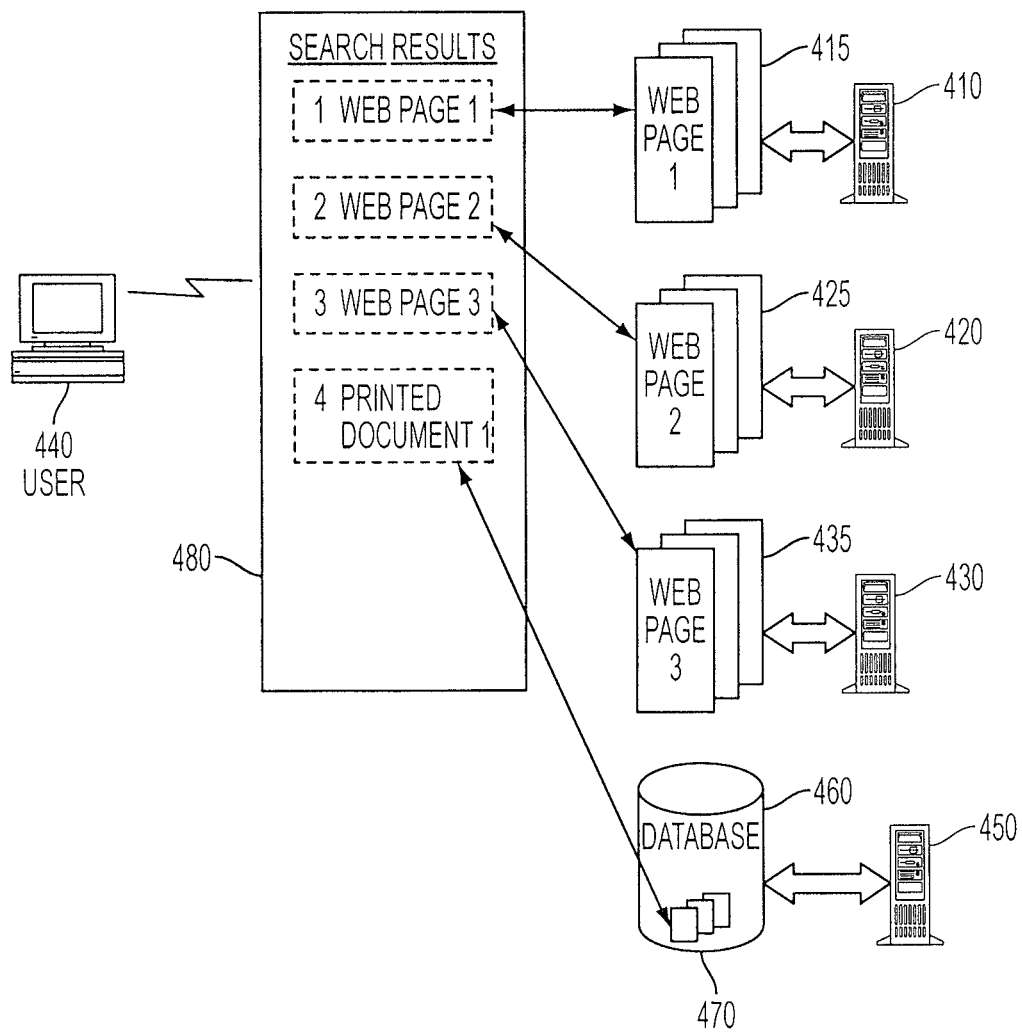
FIG. 4 illustrates a search result including hyperlinked printed media, according to an example embodiment of the method of the present invention.

FIG. 4 illustrates another embodiment of the present invention. A plurality of hyperlinked document (or "web page") servers (e.g. 410, 420, and 430 respectively), at least one user computer 440, and a server 450 hosting a database 460 of hyperlinked documents 470 derived from printed media are communicatively coupled to a data network, the Internet for example (not shown). Servers 410, 420, and 430 host web sites 415, 425, and 435 respectively. User 440 may use a search engine to search for relevant information on the data network. The search engine searches not only web sites, but also database 460, thereby including information contained on printed media in the search. Responsive to the search, search engine 480 displays a listing of ranked search results. A search result may be hyperlinked to a source hyperlinked document. The search results may be ranked according to relevance to a user search query and/or other ranking criteria. Search results include for example, web page 1 of web site 415 hosted by server 410, web page 2 of web site 425 hosted by server 420, and web page 3 of web site 435 hosted by server 430. Additionally, the search results indicate printed document 1, which corresponds to one of the hyperlinked documents 470 stored in database 460 on server 450.

In one embodiment, the hyperlinked documents 470 are electronic images derived from printed media, and the hyperlinked documents themselves may be searched by the search engine. Database 460 includes abstracts summarizing electronic images derived from printed media, and the abstracts are searched by the search engine. The resulting search results are hyperlinked to the abstracts, the abstracts being further hyperlinked to any of the following: a complete (full text) electronic image, an electronic image of a page of the source printed media containing the information described by the abstract, a printed media home page, a publisher's web site, a snippet (i.e., excerpt or expanded summary) of the source printed media information, locator information to the source printed media, web pages having related information, or, some other source destination.

According to another embodiment, access to an electronic image hyperlinked to an abstract is supervised by a logical entry portal. For example, a user must pass through an intermediate security hyperlinked document before being forwarded to a destination hyperlinked document described by an abstract. Access supervision may be controlled by password or other conventional identification verification mechanisms. Additionally, access supervision may be made contingent on payment of fees, either on a per-access or membership basis.

Access to database 460 can be implemented by a search engine that is limited and controlled. In other words, access to the hyperlinked documents derived from printed media is secured by typical measures, and not all web-based search engines are permitted to search database 460 and/or the hyperlinked documents contained therein. For example, access permission is exchanged for periodic payment of a.

It should be appreciated that the present invention is not to be necessarily limited to the particular embodiments described herein, which are meant only to be exemplary for facilitating an understanding of the invention. For instance, while hyperlinked documents are illustrated, other techniques for organizing, relating and navigating stored information systems can benefit from the above mentioned teachings. Various modifications, equivalent processes, as well as numerous structures to which the present invention may be applicable will be readily apparent to those of skill in the art to which the present invention is directed upon review of the present specification. The claims are intended to cover such modifications and devices.

It should be appreciated that reference throughout this specification to "one embodiment" or "an embodiment" or "implementation" or "an aspect" of the invention means that a particular feature, structure or characteristic described in connection with the embodiment is included in at least one embodiment of the present invention. Therefore, it is emphasized and should be appreciated that two or more references to "an embodiment" or the like in various portions of this specification are not necessarily all referring to the same embodiment. Furthermore, the particular features, structures or characteristics of one or more embodiments or aspects described may be combined or implemented independently of each other as suitable in one or more embodiments of the invention.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "only one" or similar language is used. Unless expressly stated otherwise, "or" means "and/or" herein.

It should further be appreciated that, in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims (also as such may be amended, reissued, etc., from time to time) are hereby expressly incorporated into this Detailed Description, with each claim standing on its own as a separate embodiment of this invention.

What is claimed is:

1. A method implemented by one or more processors in one or more server devices, the method comprising:
   receiving an image of a printed item;
   storing document representing the image of the printed item,
      where the document includes:
         content data that includes content from a first area of the image of the printed item, and
         advertisement data representing one or more advertisements from a second area of the image of the printed item,
            where the advertisement data is different from the content data and includes information about at least one product or service;
   identifying, based on the information about the at least one product or service included in the advertisement data, one or more links to updated advertisement information; and
   modifying the document to include the one or more links,
      where the modified document, when displayed via a browser application, presents the content data in the first area of the printed item and the updated advertisement information in the second area of the printed item,
      the one or more advertisements not being visible in the displayed modified document.

2. The method of claim 1, where the updated advertisement information includes at least one of:
   an electronic reference for accessing further information about the printed item, or
   a link to information about one of the at least one product or service corresponding to an advertisement in the printed item.

3. The method of claim 1, where the printed item comprises a copyrighted printed item,
   where the printed item is associated with at least one publisher, and
   where the method further comprises:
      executing a permission protocol to receive authorization, from the at least one publisher, to provide additional content data from the printed item.

4. The method of claim 3, where the authorization permits a search engine to present the additional content data from the printed item, the authorization being based on an electronic reference included in the updated advertisement information.

5. The method of claim 1, further comprising:
   storing an index of the content data; and
   providing a hyperlink associated with an entry in the index corresponding to a representation of the printed item.

6. The method of claim 1, where the modified document is displayed via the browser application based on a search query that is related to the printed item, and
   where the method further comprises:
      presenting, based on the search query, one or more documents that are related to the printed item.

7. The method of claim 1, where the method further comprises:
   providing a hyperlink to an electronic image of the printed item.

8. The method of claim 1, further comprising:
   blocking one or more portions, of the printed item, that are not authorized for distribution, from being displayed via the browser application.

9. A system, comprising:
   at least one processor to:
      receive an image of a printed item,
      store a content data set representing content from the image of the printed item,
      store advertisement data sets representing one or more advertisements included in the image of the printed item,
         where the advertisement data sets differ from the content data set and include information about at least one product or service, and
         where the printed item includes a layout for the content and the one or more advertisements,
      identify, based on the information about the at least one product or service, updated advertisement information that is not included in the advertisement data sets, and
      present, based on the layout, a representation of the printed item that includes the content associated with the printed item and the updated advertisement information,
         where the one or more advertisements are not visible in the representation, and
         where the at least one processor, when presenting the representation, is further to:
            format, based on the layout, the presented content, in the representation, and the presented updated advertisement information,
            in the representation, to resemble the printed item.

10. The system of claim 9, where the updated advertisement information includes at least one of:
    an electronic reference for accessing further information about the printed item, or
    a link to the information about the at least one product or service.

11. The system of claim 9, where the printed item comprises a copyrighted printed item, and
    where the at least one processor is further to:
       block portions, of the printed item, that are not authorized for distribution, from being presented, and
       execute a permission protocol to receive authorization, from a publisher associated with the printed item, to provide at least one of:
          the blocked portions of the printed item, or
          additional information related to the printed item.

12. The system of claim 9, where the at least one processor is further to:
    store an index of the content data set in a searchable format, and
    provide a hyperlink to the representation of the printed item.

13. The system of claim 9, where the at least one processor is further to:
    search for one or more web documents related to the printed item, and
    present information regarding the one or more web documents.

14. A non-transitory computer readable medium that stores a plurality of instructions which are executable by one or more processors in one or more devices, the plurality of instructions comprising:

one or more instructions to receive an image of a printed item;
one or more instructions to store:
a content data set representing content from the image of the printed item, and
advertisement data sets representing one or more advertisements from the image of the printed item,
where the advertisement data sets are different from the content data set and include information about at least one product or service, and
information about a layout of the printed item;
one or more instructions to identify, based on the information about the at least one product or service, updated advertisement information that does not appear in the printed item; and
one or more instructions to present, based on the information about the layout of the printed item, a representation of the printed item that includes the content data set and the updated advertisement information,
the representation not including the one or more advertisements from the printed item, and
the one or more instructions to present the representation including
one or more instructions to format, in the representation, the content and the updated advertisement information to resemble the printed item.

15. The computer readable medium of claim 14, where the updated advertisement information includes at least one of:
an electronic reference for accessing further information about the printed item, or
a link to the information about the at least one product or service.

16. The computer readable medium of claim 14, where the printed item comprises a copyrighted printed item, and
where the plurality of instructions further comprises:
one or more instructions to block a portion, of the printed item, that is not authorized for distribution, from being presented, and
one or more instructions to execute a permission protocol to request authorization, from a publisher associated with the printed item, to present at least one of:
the blocked portion of the printed item, or
additional information related to the printed item.

17. The computer readable medium of claim 14, where the one or more instructions, to present the content associated with the printed item and the updated advertisement information, further include:
one or more instructions to present the content associated with the printed item and the updated advertisement information based on receiving a search query that is related to the printed item.

18. The computer readable medium of claim 17, where the plurality of instructions further comprises:
one or more instructions to search, based on the search query, for one or more web documents, and
one or more instructions to present information regarding the one or more web documents, when presenting the content associated with the printed item and the updated advertisement information.

19. The system of claim 11, where the authorization is based on an electronic reference in the updated advertisement information, and
where the at least one processor is further to:
present, to a user and based on the authorization, additional content from one or more relevant printed items.

20. The system of claim 9, where the at least one processor is further to:
block portions, of the printed item, that are not authorized for distribution, from being presented to a user.

21. The computer readable medium of claim 14, where the plurality of instructions further comprises:
one or more instructions to store an index of the content data set in a searchable format; and
one or more instructions to provide a hyperlink associated with an entry in the index corresponding to the representation of the printed item.

22. The computer readable medium of claim 16, where the authorization permits a search engine to present additional content from the printed item, and where the authorization is based on an electronic reference in the updated advertisement information.

23. The computer readable medium of claim 14, where the plurality of instructions further comprises:
one or more instructions to provide a hyperlink to an electronic image of the printed item.

24. The computer readable medium of claim 14, where the one or more instructions, to present the content associated with the printed item and the updated advertisement information, further include:
one or more instructions to block presentation of portions, of the printed item, that are not authorized for distribution.

25. A system, comprising:
one or more server devices to:
receive an image of a printed item;
store a content data set representing content from the image of the printed item;
store an advertisement data set representing an advertisement included in the image of the printed item,
the advertisement data set differing from the content data set and including information about a product or a service, and
the printed item including a layout for the content and the advertisement;
identify a web page related to the product or the service;
modify the advertisement, to include a link to the web page, to form a modified advertisement; and
present, based on the layout, a representation of the printed item that includes the content associated with the printed item and the modified advertisement,
the representation being formatted, based on the layout, to resemble the printed item,
selection of the modified advertisement, from within the representation, causing the web page to be presented.

26. The system of claim 25, where the web page corresponds to:
an order-processing web page that permits the product or the service to be ordered,
an advertiser web page corresponding to an advertiser associated with the advertisement, or
a product or service web page that includes additional information regarding the product or the service.

* * * * *